Patented June 3, 1924.

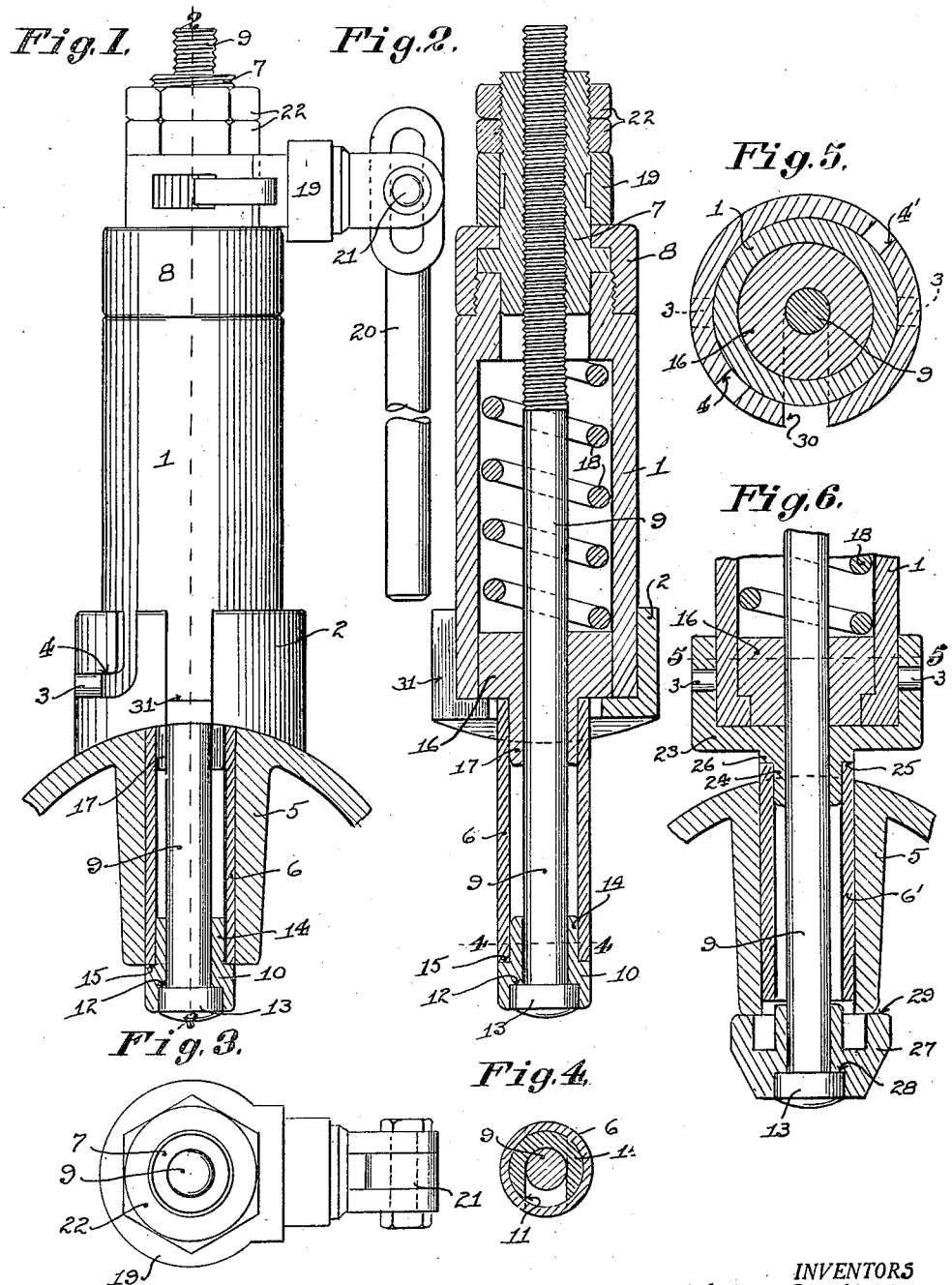

1,496,451

UNITED STATES PATENT OFFICE.

WALLACE CANFIELD AND JULIUS AUGUST BRUCKE, OF TAFT, CALIFORNIA.

TOOL FOR REMOVING AND REPLACING BUSHINGS.

Application filed August 7, 1923. Serial No. 656,178.

*To all whom it may concern:*

Be it known that we, WALLACE CANFIELD and JULIUS AUGUST BRUCKE, citizens of the United States, residing at Taft, in the county of Kern and State of California, have invented certain new and useful Improvements in Tools for Removing and Replacing Bushings, of which the following is a specification.

Our invention relates to the class of tools for removing and replacing journal bushings.

The object of our invention is to provide a tool of this class which is simple, effective, and portable, and which will operate with the least possible danger of injuring the part or structure in which the bushing is mounted. A further object is to provide such a tool which is capable of accommodating itself to wide variations, both in the size of the bushings handled and in the character and form of the parts in which said bushings are carried.

Our tool is compact, small, and readily portable, so that bushings can frequently be removed and replaced without the necessity of dismantling the part affected. It is the common practise to remove the part in which the bushing is mounted and place it in a vise or press for removing and replacing the bushing. This is likely to result in danger to the part, particularly when clamped in a vise and the bushing removed and replaced by means of a punch and hammer. This danger of damage is practically eliminated by the use of our device, as is also the necessity for a compartively more expensive press.

A preferred embodiment of our invention is herewith illustrated and described, with the understanding that the construction and form may be varied, within the limits of the claims hereto appended, without departing from the essential principles of the invention.

Referring to the accompanying drawings,

Fig. 1 is a side elevation of our bushing tool showing the parts arranged for removing a bushing from an engine piston, the bushing and piston being shown in section.

Fig. 2 is a longitudinal section taken on the line 2—2 of Fig. 1.

Fig. 3 is a rear end elevation of our tool.

Fig. 4 is a section taken on the line 4—4 of Fig. 2.

Fig. 5 is a cross section taken on the line 5—5 of Fig. 6.

Fig. 6 is a longitudinal section of the end portion of our tool showing the parts arranged for replacing the bushing within the piston.

In the drawings, the reference numeral 1 designates a tubular shell or body, to one end of which is fitted a removable shoe 2. As a preferred means for securing said shoe to the body 1, we have shown pins 3 projecting from said body and adapted to be engaged by bayonet-slots 4 in said shoe. The shoe 2 is adapted to bear against the part in which the bushing is mounted, and is shaped approximately to fit said part. If the tool is to be used for removing the wrist pin bushings from engine pistons, for example, the shoe 2 will be curved, as shown in Figs. 1 and 2, to fit the circumference of the piston, said piston being shown at 5 and the bushing at 6. It is intended that a plurality of shoes 2 shall be furnished with each tool, the shapes of which will vary to fit the different classes of parts from which bushings are to be removed.

The other end of the body 1 carries a rotatable nut 7, held in place by a retaining ring 8. Through said nut is threaded a mandrel 9, the thread on said mandrel being long enough to permit it to have the necessary amount of longitudinal movement. The outer end of the mandrel 9 carries a removable pulling head 10. We prefer to provide said head with a radial slot 11, Fig. 4, to enable it to be slipped laterally over the mandrel 9, and a seat 12, Figs. 1 and 2, adapted to fit over a flange 13, formed upon said mandrel, but other suitable means for removably mounting said head upon said mandrel may be employed. The pulling head 10 has a portion 14 adapted to enter the end of the bushing 6, and a shoulder 15 to bear against the end thereof. Said pulling head must conform in diameter to the size of the bushing, so that a number of such heads, of different sizes, should be supplied with each tool.

A guide 16, having a portion 17 adapted to enter the opposite end of the bushing 6, is freely fitted around the mandrel 9 and within the body 1. A spring 18 normally holds said guide against the shoe 2. The nut 7 is provided with a double acting ratchet member 19 of any suitable and well known form, and an operating lever or handle 20 is secured to said ratchet member for operating the same. Said handle is preferably provided with a hinged joint 21 to allow it to be folded down parallel to the body 1 when not in use. The construction of the ratchet member 19 forms no part of the present invention, and has therefore been omitted from the drawings, it being understood that any suitable ratchet device may be used which will permit the handle 20 to turn the nut 7 in either direction, at will. Retaining nuts 22 hold the ratchet 19 in position upon the nut 7.

It will be seen that, by turning the nut 7 by means of its ratchet 19 and handle 20, the mandrel 9 is moved into or out of the body 1, sliding freely through the guide 16. When a bushing is to be removed, a shoe 2 of the proper form is affixed to the body 1 and placed against the part 5 in which said bushing is mounted as shown in Fig. 1. The mandrel 9 is allowed to extend through the bushing 6, the portion 17 of the guide 16 entering the near end of said bushing and the mandrel head 13 projecting beyond its far end. A pulling head 10 of the proper size is then slipped over the end of the mandrel 9, and, by turning the nut 7 in the proper direction, the bushing is withdrawn into the body 1, the guide 16 being held by its spring 18 against the near end of said bushing to insure proper centering.

For replacing a new bushing, such, for example, as that shown at 6′ in Fig. 6, a seating shoe 23 is substituted for the shoe 2. This seating shoe has bayonet slots 4′ to engage the pins 3 of the body 1, and is also provided with a portion 24 adapted to enter the bushing 6′, a shoulder 25 to bear against the end of said bushing, and a portion 26 adapted to enter the bore into which the bushing fits, to allow said bushing to be countersunk if desired. Said seating shoe 23 is placed against the near end of the bushing 6′, said bushing being started in its bore, and the mandrel 9 is allowed to extend through the bushing, and a seating head or anchor block 27 placed upon its end. Said anchor block has a slot which is not shown, but is similar to the slot 11 of the pulling head 10, to allow it to slip over the mandrel 9, a seat 28 to receive the flange 13 of said mandrel, and a face 29 adapted to bear against the part into which the bushing is to be forced, said face 29 corresponding in form approximately to the shape of said part. With the parts in this position, the nut 7 is turned, by means of its ratchet 19 and handle 20, to draw the mandrel 9 inwardly, thus forcing the bushing 6′ into position in the part 5′, as shown in Fig. 6.

The seating shoe 23 is provided with a radial slot 30, Fig. 5, to enable it to be slipped over the mandrel 9 from the side. The shoe 2 may also be provided with a similar slot, as shown at 31 in Fig. 1, although this is not necessary as the interior diameter of said shoe enables it to pass over the flange 13 of said mandrel.

We claim:

1. A tool for removing and replacing bushings comprising a body member; a shoe detachably connected with one end of said body member for ready removal and substitution; a mandrel longitudinally movable within said body member; a head carried by one end of said mandrel; and means associated with its other end for moving said mandrel longitudinally within said body member.

2. A tool for the purpose described comprising a body member; a shoe carried at one end thereof; a mandrel longitudinally movable within said body member; a head detachably connected with one end of said mandrel for ready removal and substitution; and means associated with its other end for moving said mandrel longitudinally within said body member.

3. A tool for the purpose described comprising a body member; a shoe detachably connected with one end of said body member for ready removal and substitution; a mandrel longitudinally movable within said body member; a head detachably connected with one end of said mandrel for ready removal and substitution; and means associated with its other end for moving said mandrel longitudinally within said body member.

4. A tool for the purpose described comprising a hollow body member having a pressing face; a mandrel longitudinally movable within said body member and provided with a pulling head; a guide for said mandrel within said body member, said guide being adapted for retreating movement into said body member away from the pressing face thereof; and means for moving said mandrel longitudinally within said body member.

5. A tool for the purpose described comprising a hollow body member having a pressing face; a mandrel longitudinally movable within said body member and provided with a pulling head; a guide for said mandrel within said body member, said guide being adapted for retreating movement into said body member away from the pressing face thereof; a spring within said body member for retaining said guide in its normal position; and means for moving said mandrel longitudinally within said body member.

6. A tool for the purpose described comprising a hollow body member having a pressing face; a mandrel longitudinally movable within said body member and provided with a pulling head; a guide for said mandrel within said body member, said guide having a portion normally projecting beyond said pressing face to center the same, and being adapted for retreating movement into said body member; and means for moving said mandrel longitudinally within said body member.

In testimony whereof we have signed our names to this specification.

WALLACE CANFIELD.
JULIUS AUGUST BRUCKE.